United States Patent
Chae et al.

(10) Patent No.: US 8,893,055 B2
(45) Date of Patent: Nov. 18, 2014

(54) MOBILE TERMINAL AND OPERATING METHOD THEREOF

(75) Inventors: Byungkee Chae, Seoul (KR); Eunjin Kim, Seoul (KR); Junhee Kim, Seoul (KR); Kyungjin Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 342 days.

(21) Appl. No.: 13/117,306

(22) Filed: May 27, 2011

(65) Prior Publication Data

US 2012/0129495 A1 May 24, 2012

(30) Foreign Application Priority Data

Nov. 24, 2010 (KR) .................. 10-2010-0117306

(51) Int. Cl.
G06F 3/033 (2013.01)
G06F 3/0488 (2013.01)
G06F 3/0486 (2013.01)
H04M 1/725 (2006.01)
G06F 3/0481 (2013.01)
H04M 1/67 (2006.01)

(52) U.S. Cl.
CPC ....... *H04M 1/72522* (2013.01); *G06F 3/04883* (2013.01); *G06F 3/0486* (2013.01); *H04M 1/72583* (2013.01); *H04M 2250/22* (2013.01); *G06F 3/04817* (2013.01); *G06F 3/04886* (2013.01); *H04M 1/67* (2013.01); *H04M 2250/66* (2013.01)
USPC ........... 715/863; 715/864; 715/847; 715/851; 715/811

(58) Field of Classification Search
USPC ........................................................ 715/863
See application file for complete search history.

(56) References Cited

U.S. PATENT DOCUMENTS

| | | | |
|---|---|---|---|
| 2005/0253817 A1* | 11/2005 | Rytivaara et al. | 345/173 |
| 2006/0179410 A1* | 8/2006 | Deeds | 715/750 |
| 2007/0150842 A1* | 6/2007 | Chaudhri et al. | 715/863 |
| 2007/0184858 A1* | 8/2007 | Landschaft et al. | 455/466 |
| 2008/0115088 A1* | 5/2008 | Frankel et al. | 715/835 |
| 2008/0167071 A1* | 7/2008 | Forstall et al. | 455/556.2 |
| 2009/0284482 A1* | 11/2009 | Chin | 345/173 |
| 2010/0060595 A1 | 3/2010 | Lee et al. | |
| 2010/0105440 A1* | 4/2010 | Kruzeniski et al. | 455/566 |
| 2010/0167781 A1* | 7/2010 | Seo | 455/552.1 |
| 2010/0269040 A1 | 10/2010 | Lee | |
| 2011/0081951 A1* | 4/2011 | Hwang | 455/558 |
| 2011/0306318 A1* | 12/2011 | Rodgers et al. | 455/410 |
| 2012/0129495 A1* | 5/2012 | Chae et al. | 455/411 |

FOREIGN PATENT DOCUMENTS

| | | |
|---|---|---|
| EP | 2 019 540 | 1/2009 |
| WO | WO 99/41921 | 8/1999 |

OTHER PUBLICATIONS

Hands-on with Sprint ID Android homescreen profiles—Oct. 6, 2010.*
European Search Report dated May 23, 2012 for Application 11007885.4.

* cited by examiner

*Primary Examiner* — Steven Sax
*Assistant Examiner* — David Choi
(74) *Attorney, Agent, or Firm* — KED & Associates LLP

(57) ABSTRACT

Provided is a mobile terminal including a plurality of user identification modules and an operating method thereof. The mobile terminal includes a touch screen, and a controller configured to simultaneously unlock the mobile terminal and at least one of the plurality of user identification modules in response to a touch made on the touch screen.

28 Claims, 30 Drawing Sheets

(a)          (b)

MOBILE TERMINAL AND OPERATING METHOD THEREOF

This application claims the benefit of Korean Patent Application No. 10-2010-0117306 filed on Nov. 24, 2010 which are hereby incorporated by reference.

BACKGROUND

1. Field

This document relates to a mobile terminal including a plurality of user-identification modules and an operating method thereof.

2. Related Art

Functions of a terminal, such as a personal computer, a laptop computer, a portable phone, and/or a smart phone, have been diversified. Such a terminal has been manufactured in the form of a multimedia player that allows the user to capture images or moving images, reproduce a moving image, play games, and receive a broadcasting signal.

In order to support the various functions of a terminal, many efforts have been made to improve the hardware and/or software structures of the terminal. Furthermore, a menu structure of the terminal has been complicated to support various functions of a terminal. Lately, a mobile terminal for using a plurality of telephone numbers using a plurality of user-identification modules has received attention.

SUMMARY

According to an embodiment of the present invention, a user simultaneously unlocks a mobile terminal and at least one of user identification modules by making a touch on a touch screen.

According to another embodiment of the present invention, a user can perform a desired function using a home screen customized to a unlocked user identification module.

According to still another embodiment of the present invention, a user can directly perform a predetermined function without additional operation for selecting a user identification module.

In accordance with an embodiment of the present invention, a mobile terminal including a plurality of user identification modules comprises a touch screen, and a controller configured to simultaneously unlock the mobile terminal and at least one of the plurality of user identification modules in response to a touch made on the touch screen.

In accordance with another embodiment of the present invention, a mobile terminal including a plurality of user identification modules comprises a touch screen configured to display a plurality of regions corresponding to the plurality of user identification modules, and a controller configured to simultaneously unlock the mobile terminal and a user identification module corresponding to selected one of the plurality of regions in response to a touch made on the touch screen, wherein the selected one is decided based on at least one of a position and a direction of the touch.

In accordance with still another embodiment of the present invention, a method for operating a mobile terminal including a plurality of user identification modules, comprises recognizing a touch made on a touch screen, and unlocking the mobile terminal and at least one of the plurality of user identification modules at the same time in response to the recognized touch.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
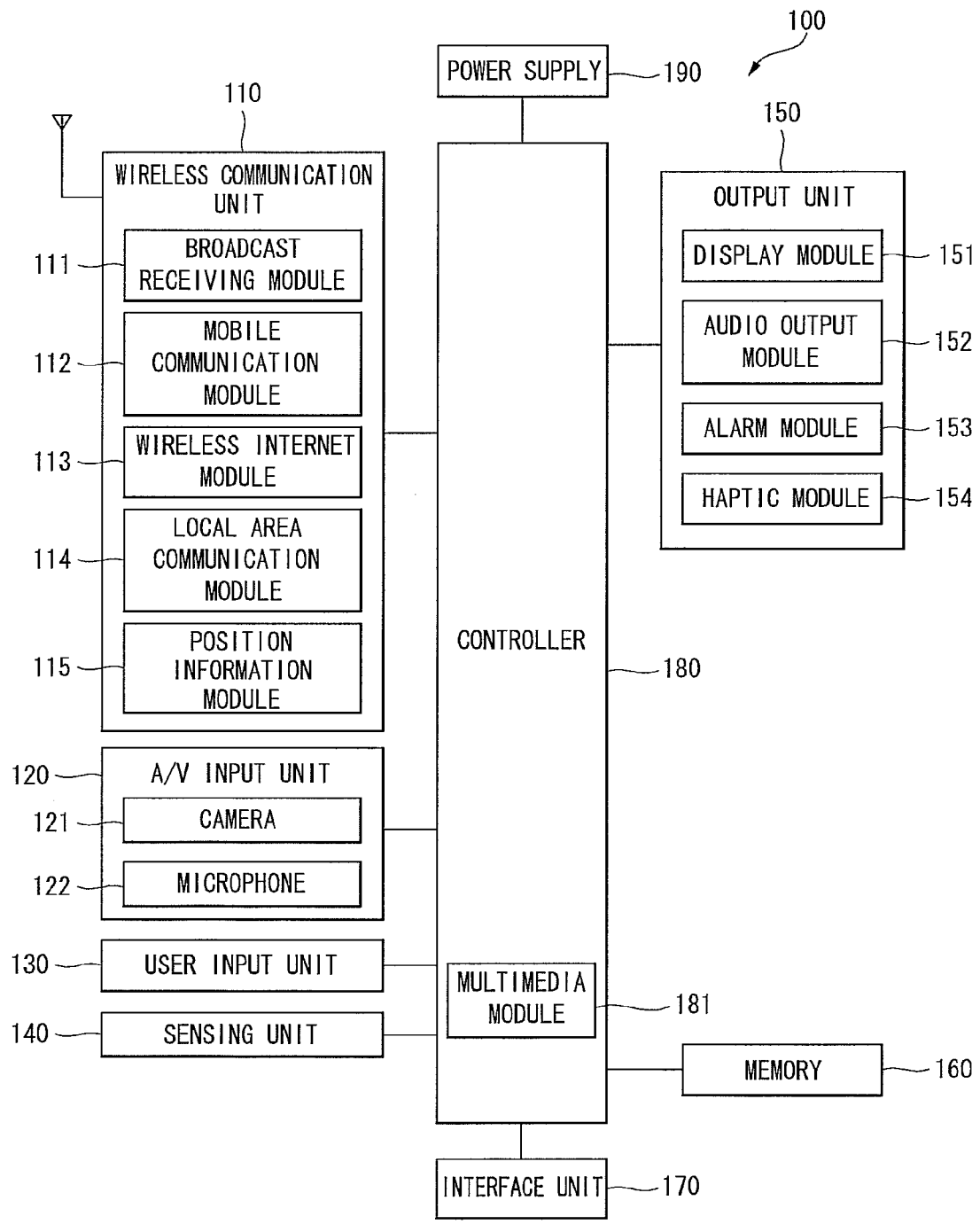
FIG. 1 is a block diagram that illustrates a mobile terminal according to an embodiment of the present invention.
Figure 2:
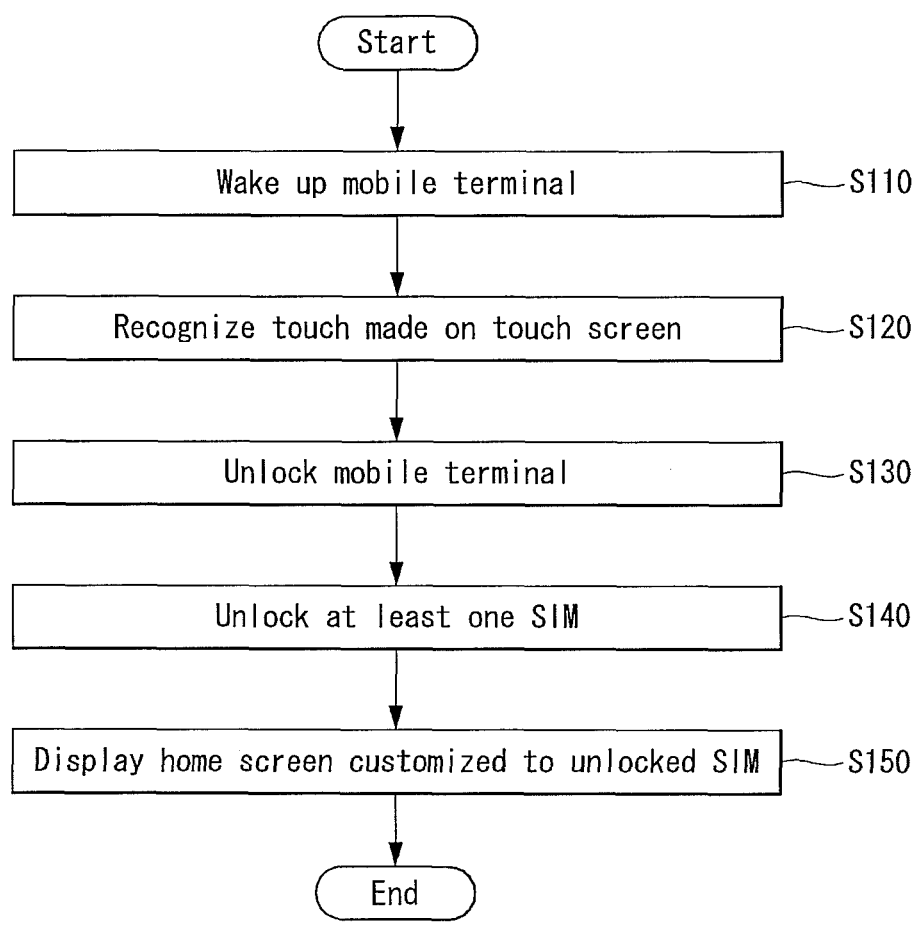
FIG. 2 is a flowchart that illustrates a method for operating a mobile terminal according to an embodiment of the present invention.

FIG. 1 is a block diagram that illustrates a mobile terminal according to an embodiment of the present invention. FIG. 1 shows the mobile terminal as an example of electronic device. The mobile terminal 100 can include a wireless communication unit 110, an audio/video (A/V) input unit 120, a user input unit 130, a sensing unit 140, an output unit 150, a memory 160, an interface unit 170, a controller 180, and a power supply unit 190. The components shown in FIG. 2 are not essential parts and the number of components included in the mobile terminal can be varied.

The components of the mobile terminal will now be described.

The wireless communication unit 110 can include at least one module that enables radio communication between the mobile terminal 100 and a radio communication system or between the mobile terminal 100 and a network in which the mobile terminal 100 is located. For example, the wireless communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time.

Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display module 151.

The image frames processed by the camera 121 can be stored in the memory 160 or transmitted to an external device through the wireless communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply unit 190 supplies power and whether the interface unit 170 is connected to an external device. The sensing unit 140 can include a proximity sensor.

The output unit 150 generates visual, auditory or tactile output and can include the display module 151, an audio output module 152, an alarm module 153 and a haptic module 154.

The display module 151 displays information processed by the mobile terminal 100. For example, the display module 151 displays UI or graphic user interface (GUI) related to a telephone call when the mobile terminal is in the call mode. The display module 151 displays a captured or/and received image, UI or GUI when the mobile terminal 100 is in the video telephony mode or the photographing mode.

The display module 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display module 151 can also be of the light transmission type. According to this structure, a user can see an object located behind the body of the mobile terminal 100 through an area of the body of the mobile terminal 100, which is occupied by the display module 151.

The mobile terminal 100 can include at least two display modules 151 according to constitution of the terminal. For example, the mobile terminal 100 can include a plurality of displays that are arranged on a single face at a predetermined distance or integrated. Otherwise, the plurality of displays can be arranged on different sides.

In the case where the display module 151 and a sensor sensing touch (referred to as a touch sensor hereinafter) form a layered structure, which is referred to as a touch screen hereinafter, the display module 151 can be used as an input device in addition to an output device. The touch sensor can be in the form of a touch film, a touch sheet and a touch pad, for example.

The touch sensor can be constructed such that it converts a variation in pressure applied to a specific portion of the display module 151 or a variation in capacitance generated at a specific portion of the display module 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the wireless communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm module 153 outputs a signal for indicating generation of an event of the mobile terminal 100. Examples of events generated in the mobile terminal include receiving of a call signal, receiving of a message, input of a key signal, input of touch, etc. The alarm module 153 can output signals in forms different from video signals or audio signals, for example, a signal for indicating generation of an event through vibration. The video signals or the audio signals can be also output through the display module 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface unit 170 serves as a path to all external devices connected to the mobile terminal 100. The interface unit 170 receives data from the external devices or power and transmits the data or power to the internal components of the mobile terminal 100 or transmits data of the mobile terminal 100 to the external devices.

The interface unit 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a card slot included in the interface unit 170.

The interface unit 170 can serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply unit 190 receives external power and internal power and provides power required for the operations of the components of the mobile terminal under the control of the controller 180.

Various embodiments of the inventive concept can be implemented in a computer or similar device readable recording medium using software, hardware or a combination thereof, for example.

According to hardware implementation, the embodiments of the inventive concept can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Previously, general operations and functions of the mobile terminal 100 according to the present embodiment were described with reference to FIG. 1. The mobile terminal 100 is unlocked by responding to a touch made by a user on a touch screen and unlocks at least one SIM at the same time. Hereinafter, such features of the mobile terminal 100 according to the present embodiment will be described in detail with reference to FIGS. 2 to 30. Throughout the specification a SIM denotes a user identification module.

FIG. 2 is a flowchart that illustrates a method for operating a mobile terminal according to an embodiment of the present invention. Hereinafter, the operating method will be described with reference to FIGS. 1 and 2.

At step S110, the controller 180 of the mobile terminal 100 wakes up the mobile terminal 100 in response to a control signal that is generated based on a user's action such as clicking a button (not shown).

When the user touches the touch screen of the mobile terminal 100 at step S120 the controller 180 unlocks the mobile terminal 100 in response to the touch at step S130. When the mobile terminal 100 is unlocked, the controller 180 may perform a predetermined function in response to a control signal that is generated based on the touch made by user on the touch screen.

At step S140, the controller 180 unlocks at least one of a plurality of SIMs included in the mobile terminal 100 in response to the touch. Here, when the SIM is unlocked, the controller 180 can use a communication service through a service network of the unlocked SIM. The communication service may include a call transmitting/receiving service and/or a data transmitting/receiving service.

An active state of the SIM may be a prerequisite for the unlocking of the SIM. In the specification, the activation of the SIM signifies a ready state that allows the use of functions of the mobile terminal and services from a corresponding service network which the SIM is registered.

Furthermore, the unlocked state of the SIM allows a user to directly use functions of the mobile terminal 100 and services provided from a corresponding service network of the SIM by selecting an activated SIM.

The flowchart of FIG. 2 illustrates the operation of unlocking the mobile terminal 100 and the unlocking at least one SIM are performed individually at the steps S130 and S140. However, those operations may be performed concurrently. That is, the controller 180 can simultaneously unlock the mobile terminal 100 and also unlock at least one SIM.

At step S150, the controller 180 displays a home screen customized to the unlocked SIM on the touch screen when one of the plurality of SIMs is unlocked. Here, the home screen customized to the SIM has items displayed on the home screen different from those on a general home screen. These items include icons and widgets. The user may set up items to be displayed on the home screen according to the SIM.

Figure 3:
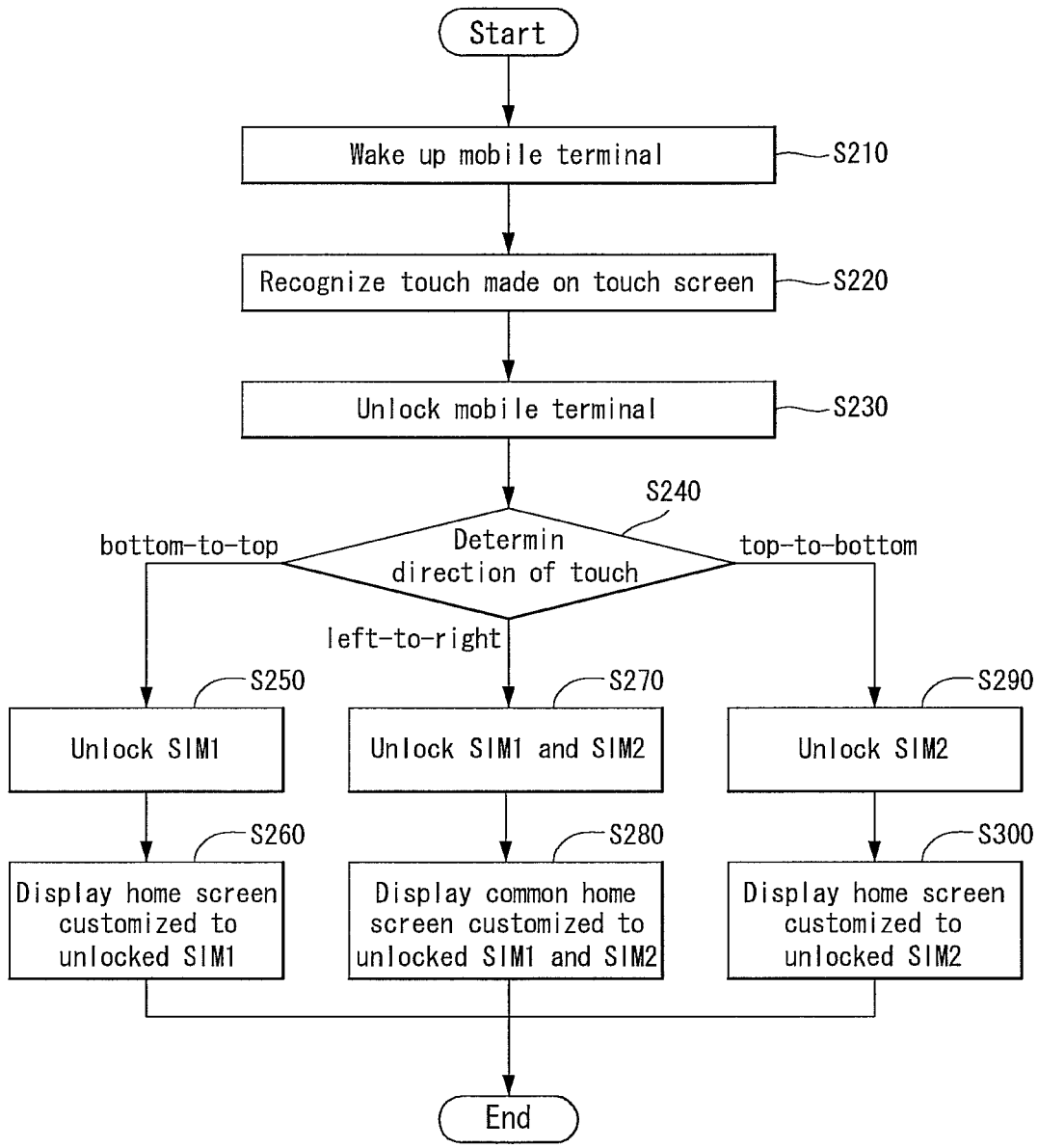
FIG. 3 is a flowchart that illustrates one example of the method for operating a mobile terminal of FIG. 2.

FIG. 3 is a flowchart that illustrates one example of the method for operating a mobile terminal of FIG. 2. The flowchart of FIG. 3 illustrates a method for unlocking SIMs based on a direction of a touch made on a touch screen when a mobile terminal 100 includes a first SIM (SIM1) and a second SIM (SIM2). Here, the touch may be a line that is drawn by a user on a touch screen. Hereinafter, the method for operating a mobile terminal will be described with reference to FIGS. 1 to 3.

Since steps S210 to S230 of FIG. 3 are identical to the steps S110 to S130, the detailed descriptions thereof are omitted herein.

At step S240, the controller 180 determines the direction of the touch. For example, the controller 180 of the mobile terminal 100 determines the directivity of a line when a user of the mobile terminal 100 draws the line on the touch screen. At step S250, the controller 180 unlocks the first SIM (SIM1) when the directivity of the line is from bottom-to-top. At step S260, the controller 180 displays a home screen customized to the first SIM (SIM1) on the touch screen.

Figure 4:
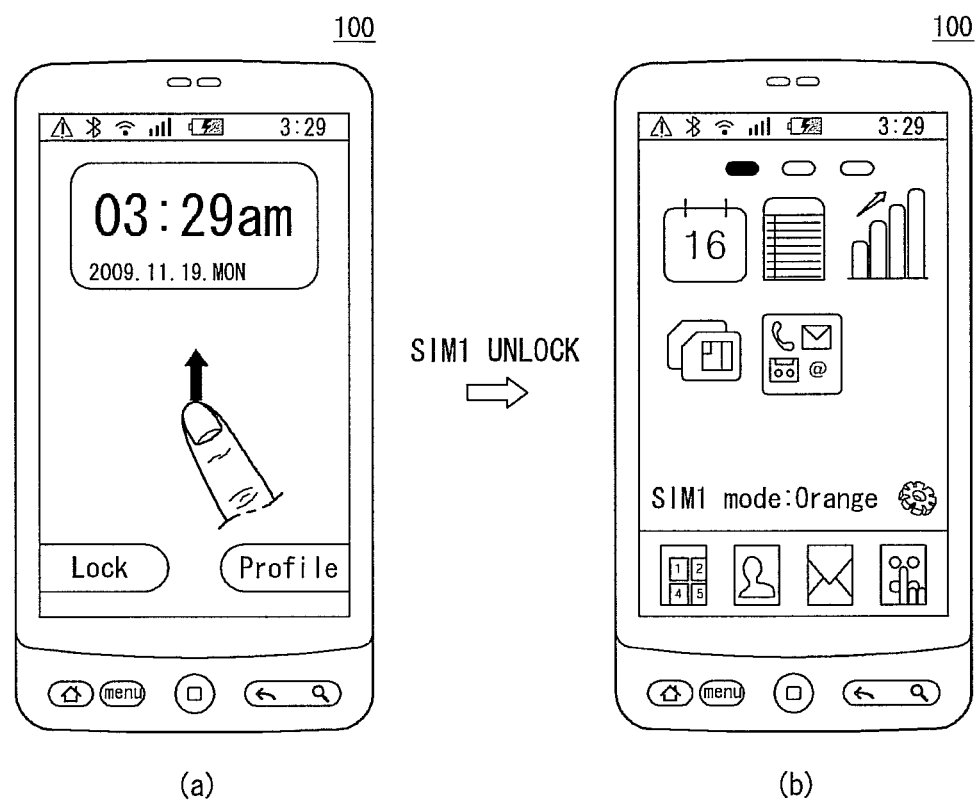
FIG. 4 illustrates unlocking a first SIM (SIM1) according to the method of operating a mobile terminal of FIG. 3.

FIG. 4 illustrates unlocking a first SIM (SIM1) according to the method of operating a mobile terminal of FIG. 3. Referring to FIG. 4, when a user draws a line a directivity of line drawn by a user on the touch screen is a bottom-to-top direction as shown in a diagram (a) of FIG. 4 the controller 180 unlocks the first SIM (SIM1) as shown in a diagram (b) of FIG. 4.

Figure 5:
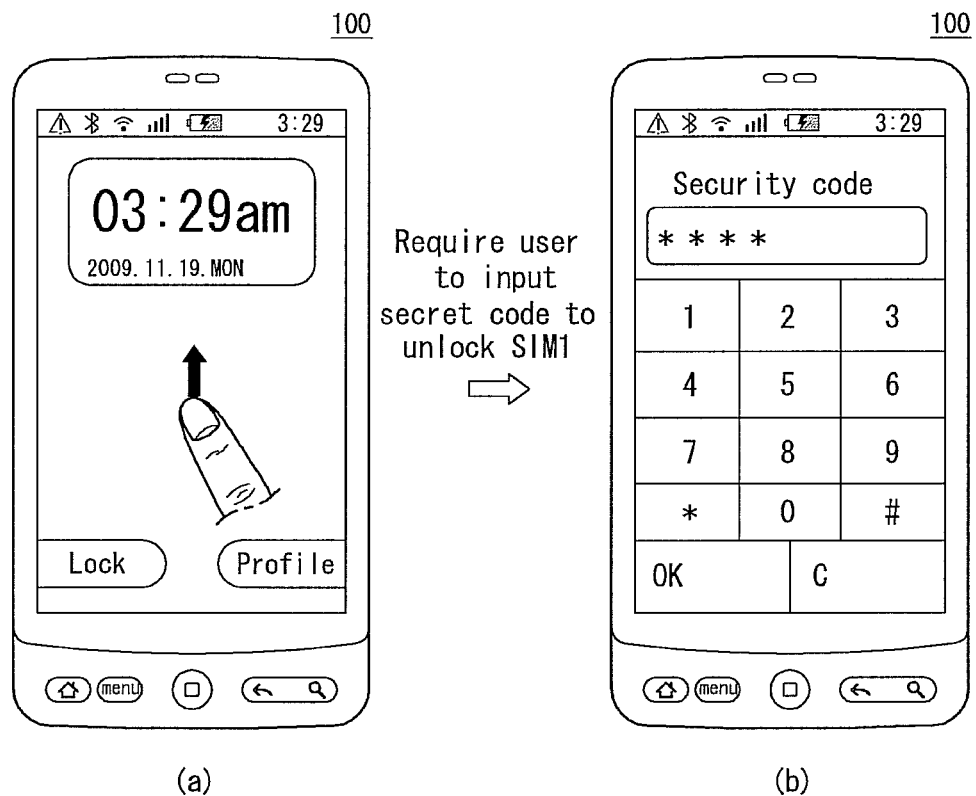
FIG. 5 illustrates a user interface for requiring a user to input a secret code to unlock the selected first SIM (SIM1).

FIG. 5 illustrates a user interface for requiring a user to input a secret code to unlock the selected first SIM (SIM1). Referring to FIG. 5, when a user draws a line in a bottom-to-top direction as shown in a diagram (a) of FIG. 5 the controller 180 of the mobile terminal 100 displays a user interface for inputting a secret code to unlock the first SIM (SIM1) as shown in a diagram (b) of FIG. 5.

A function of the mobile terminal for a SIM requiring a user to input a secret code in order to unlock may be different from a function of the mobile terminal for a SIM not requiring a user to input a secret code. For example, the first SIM (SIM1) is a SIM that requires a user to input a secret code to unlock, and the second SIM (SIM2) is a SIM that does not require a user to input a secret code to unlock.

For example, the user of the mobile terminal 100 can set the first SIM as a SIM to perform a predetermined function for processing private data. Also, the user of the mobile terminal 100 can set the second SIM as a SIM to perform a function for processing public data. In this case, the user can set a secret code for unlocking the first SIM (SIM1). Furthermore, the user can set the first and second SIMs to perform distinct functions.

When the user draws a line in a top-to-bottom direction, the controller 180 unlocks the second SIM (SIM2) at step S290 and displays a home screen customized to the second SIM (SIM2) on the touch screen at step S300.

Figure 6:
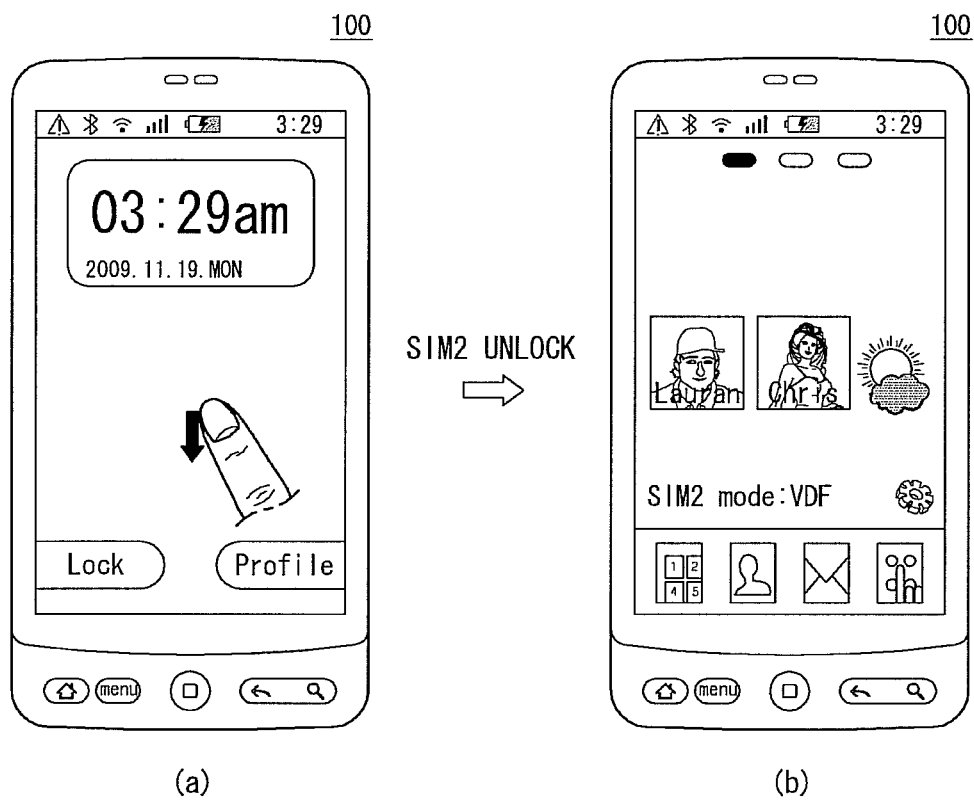
FIG. 6 illustrates unlocking the second SIM (SIM2) according to the method for operating a mobile terminal of FIG. 3.

FIG. 6 illustrates unlocking the second SIM (SIM2) according to the method for operating a mobile terminal of FIG. 3. Referring to FIG. 6, when a user draws a line in a top-to-bottom direction as shown in a diagram (a) of FIG. 6, the controller 180 of the mobile terminal 100 unlocks the second SIM (SIM2) and displays a home screen customized to the second SIM (SIM2) as shown in a diagram (b) of FIG. 6. In comparison to the diagram (b) of FIG. 4, the home screen of a diagram (b) of FIG. 6 displays different items when the SIM is unlocked.

When a user draws a line in a left-to-right direction on a touch screen, the controller 180 unlocks both of the first and second SIMs (SIM1 and SIM2) at step S270, and displays a home screen including common items of the first and second SIMs (SIM1 and SIM2) on the touch screen at step S280.

Figure 7:
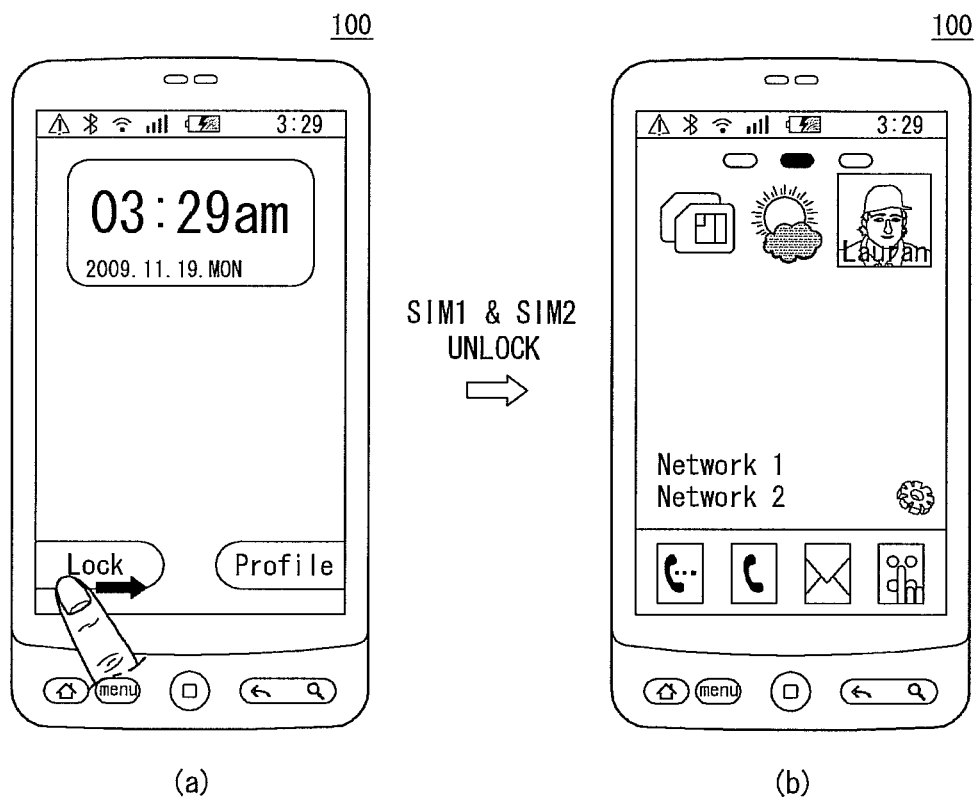
FIG. 7 illustrates a process of unlocking first and second SIMs (SIM1 and SIM2) according to the method for operating a mobile terminal of FIG. 3.

FIG. 7 illustrates a process of unlocking first and second SIMs (SIM1 and SIM2) according to the method for operating a mobile terminal of FIG. 3. Referring to FIG. 7, when a user draws a line in a left-to-right direction on the touch screen as shown in a diagram (a) of FIG. 7 the controller 180 of the mobile terminal 100 unlocks the first and second SIMs (SIM1 and SIM2) and displays a common home screen of the first and second SIMs (SIM1 and SIM2) as shown in a diagram (b) of FIG. 7.

The directivities of lines may be set and assigned to the first and second SIMs (SIM1 and SIM2) and stored in a memory 160 by a manufacturer of the mobile terminal 100. A user may set the directivities of lines and store in the memory 160 after the user obtains the mobile terminal 100.

As described above, the controller 180 of the mobile terminal 100 can unlock a predetermined SIM when the controller 180 detects a line drawn in a predetermined direction corresponding to the predetermined SIM among a plurality of SIMs included in the mobile terminal 100 as shown in FIGS. 3 to 7.

Furthermore, the controller 180 can unlock at least two SIMs when the controller 180 detects a line drawn a predetermined direction corresponding to at least two SIMs among the plurality of SIMs included in the mobile terminal 100.

Figure 8:
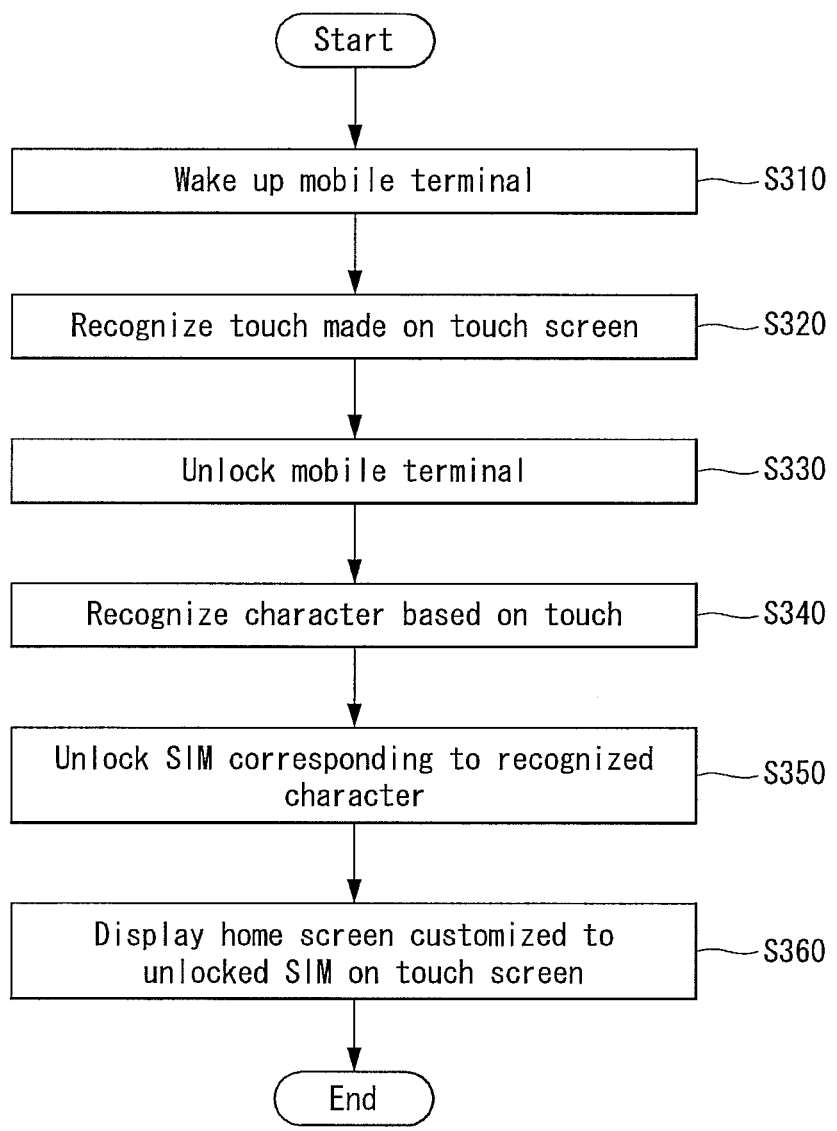
FIG. 8 is a flowchart that illustrates a method for operating a mobile terminal according to another embodiment of the present invention.

FIG. 8 is a flowchart that illustrates a method for operating a mobile terminal according to another embodiment of the present invention. Hereinafter, the method for operating a mobile terminal will be described with reference to FIGS. 1 and 8.

Since steps S310 to S330 of FIG. 8 are identical to the steps S110 to S130 of FIG. 2, the detailed descriptions thereof are omitted herein.

At step S340, the controller 180 of the mobile terminal 100 recognizes a character when a user of the mobile terminal 100 writes the character on the touch screen. At step S350, the controller 180 unlocks a SIM corresponding to the recognized character. At step S360, the controller 180 displays a home screen customized to the unlocked SIM.

Figure 9:
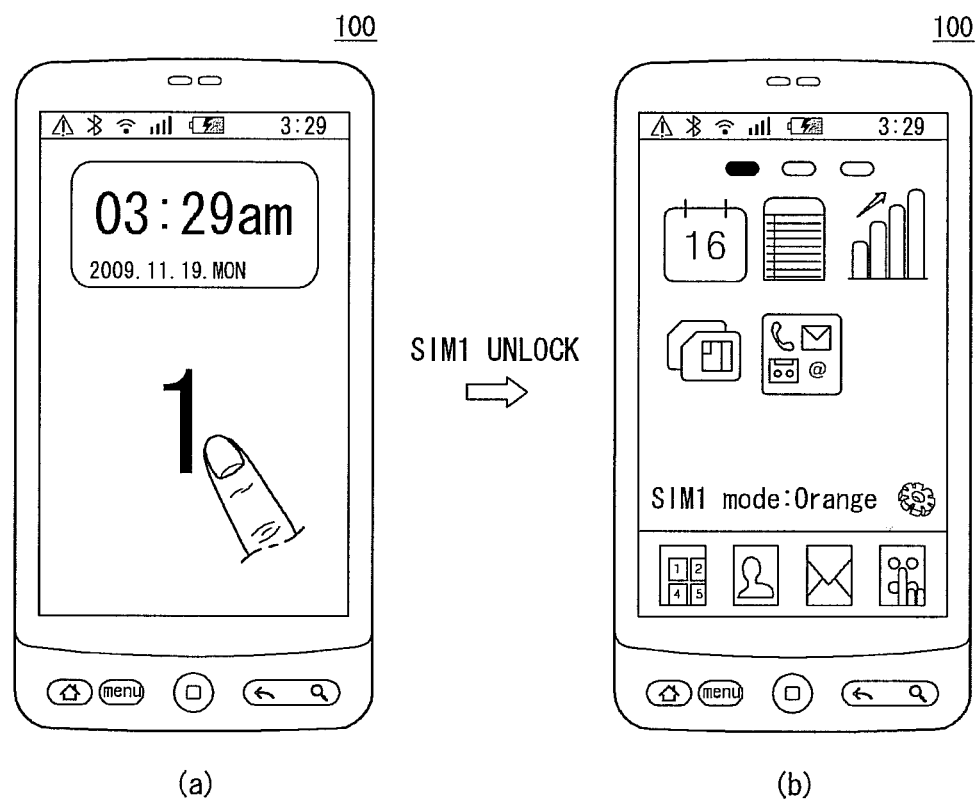
FIG. 9 depicts a process of unlocking a first SIM (SIM1) according to the method for operating a mobile terminal of FIG. 8.

FIG. 9 depicts a process of unlocking a first SIM (SIM1) according to the method for operating a mobile terminal of FIG. 8. Referring to FIG. 9, when the controller 180 recognizes a number 1 based on a character drawn by a user on the touch screen as shown in a diagram (a) of FIG. 9, the controller 180 unlocks a first SIM (SIM1) corresponding to the number 1 and displays a home screen customized to the first SIM (SIM1) as shown in a diagram (b) of FIG. 9.

Figure 10:
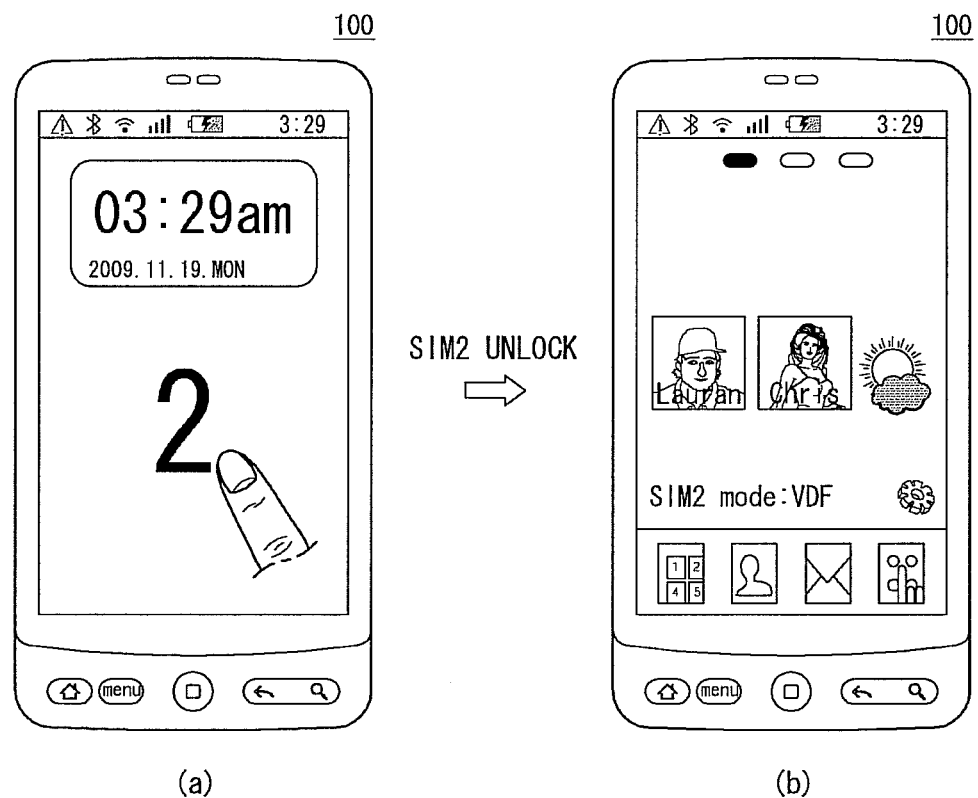
FIG. 10 illustrates a process of unlocking a second SIM (SIM2) according to the method for operating a mobile terminal of FIG. 8.

FIG. 10 illustrates a process of unlocking a second SIM (SIM2) according to the method for operating a mobile terminal of FIG. 8. Referring to FIG. 10, when the controller 180 of the mobile terminal 100 recognizes a number 2 based on a character drawn by a user on the touch screen as shown in a diagram (a) of FIG. 10, the controller 180 unlocks the second SIM (SIM2) corresponding to the recognized number 2 and displays a home screen customized to the second SIM (SIM2) as shown in a diagram (b) of FIG. 10. In comparison the home screens of the diagrams (a) and (b) of FIG. 9, the home screens of FIG. 10 display different items according to the unlocked SIM.

Figure 11:
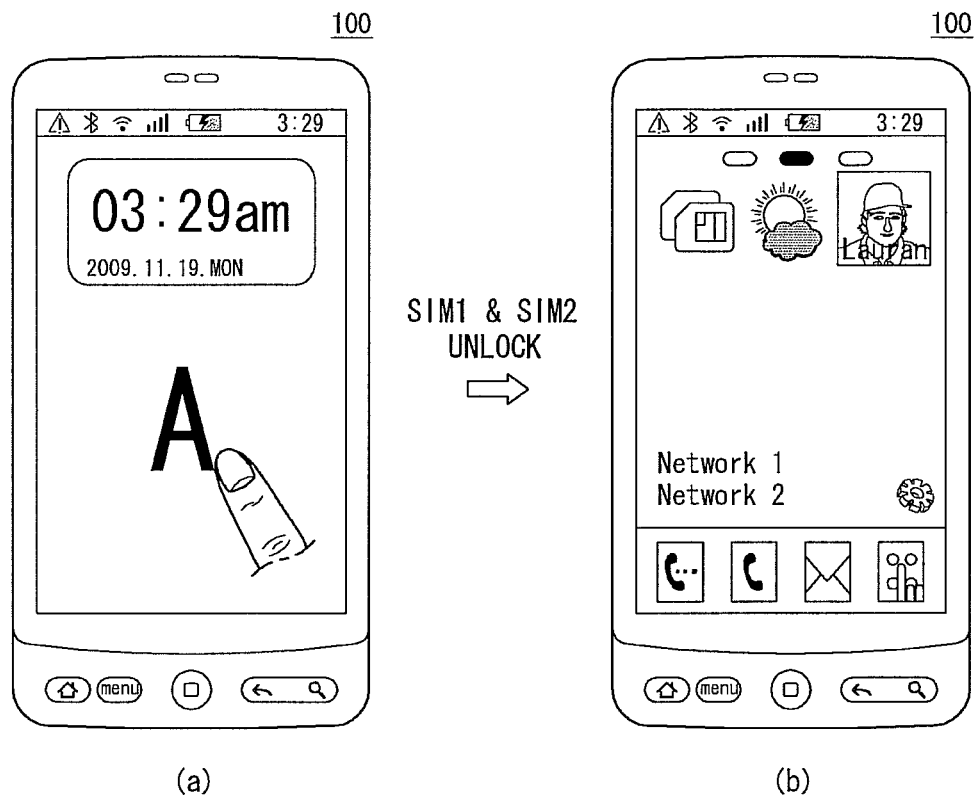
FIG. 11 illustrates a process of unlocking the first and second SIMs (SIM1 and SIM2) according to the method for operating a mobile terminal of FIG. 8.

FIG. 11 illustrates a process of unlocking the first and second SIMs (SIM1 and SIM2) according to the method for operating a mobile terminal of FIG. 8. Referring to FIG. 11, when the controller 180 of the mobile terminal 100 recognizes an alphabet A based on a character drawn by a user on the touch screen as shown in a diagram (a) of FIG. 11, the controller 180 unlocks the first and second SIMs (SIM1 and SIM2) corresponding to the recognized alphabet A and displays a common home screen of the first and second SIMs (SIM1 and SIM2) as shown in a diagram (b) of FIG. 11.

The characters corresponding to the first and second SIMs (SIM1 and SIM2) and recognized by the controller 180 may be set and stored in the memory 160 by a manufacturer when the mobile terminal 100 is manufactured. The user may set and store the characters in the memory 160 at a later time.

As described above, the controller 180 of the mobile terminal 100 can unlock at least one SIM among a plurality of SIMs based on a recognized character based on a character written by a user on the touch screen as shown in FIGS. 8 to 11.

Figure 12:
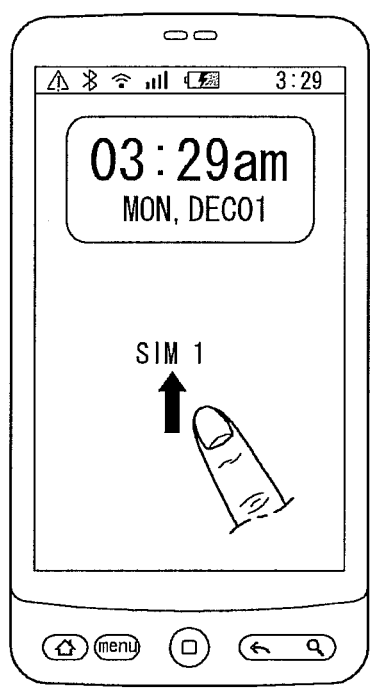
FIG. 12 illustrates displaying information on a plurality of SIMs in the mobile terminal 100 according to an embodiment of the present invention.

FIG. 12 illustrates displaying information on a plurality of SIMs in the mobile terminal 100 according to an embodiment of the present invention. FIG. 12 illustrates displayed information on SIMs included in the mobile terminal 100 when the mobile terminal 100 includes only the first SIM (SIM1) although the mobile terminal 100 can include both of the first and second SIMs (SIM1 and SIM2).

Referring to FIG. 12, when the mobile terminal 100 includes only the first SIM (SIM1), the touch screen displays only information on the first SIM (SIM1) and not display information on the second SIM (SIM2). The user can unlock the first SIM (SIM1) by drawing a line in a bottom-to-top direction on the touch screen.

The controller 180 does not perform an unlock operation for the second SIM (SIM2) and does not display a home screen customized to the second SIM although a line in a top-to-bottom direction is set for unlocking the second SIM (SIM2) and the user draws a line in the top-to-bottom direction on the touch screen.

Figure 13:
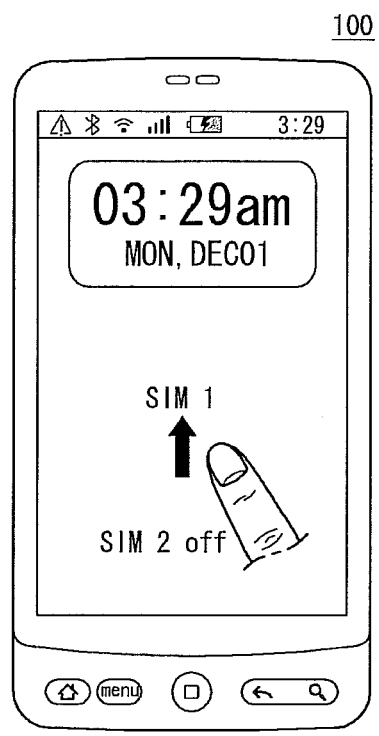
FIG. 13 illustrates information on a plurality of SIMs included in the mobile terminal 100 according to an embodiment of the present invention.

FIG. 13 illustrates information on a plurality of SIMs included in the mobile terminal 100 according to an embodiment of the present invention. For example, FIG. 13 illustrates displaying information on whether a SIM is activated or not when the first SIM (SIM1) is activated among the first and second SIMs (SIM1 and SIM2) of the mobile terminal 100.

Referring to FIG. 13, the touch screen displays "SIM2 off" for informing a user that the second SIM (SIM2) is not activated when the first SIM (SIM1) is activated and the second SIM (SIM2) is not activated. The user can unlock the first SIM (SIM1) by drawing a line in a bottom-to-top direction on the touch screen.

However, the controller 180 does not perform an unlock operation for the second SIM (SIM2) although a line in a top-to-bottom direction is set for unlocking the second SIM (SIM2) and the user draws a line in the top-to-bottom direction on the touch screen.

Figure 14:
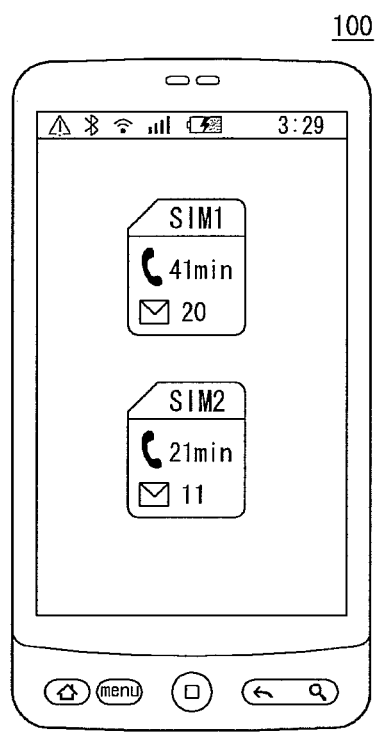
FIG. 14 illustrates use states of a plurality of SIMs included in the mobile terminal 100 according to an embodiment of the present invention.

FIG. 14 illustrates use states of a plurality of SIMs included in the mobile terminal 100 according to an embodiment of the present invention. For example, FIG. 14 illustrates use state information of SIMs that are displayed on the mobile terminal 100 when the mobile terminal 100 includes the first SIM (SIM1) and the second SIM (SIM2). Referring to FIG. 14, the use state information of each SIM includes call duration and the number of messages.

As described above, the controller 180 of the mobile terminal 100 can display information on which SIM is included in the mobile terminal 100 and which SIM is activated, and use state information as shown in FIGS. 12 to 14.

Figure 15:
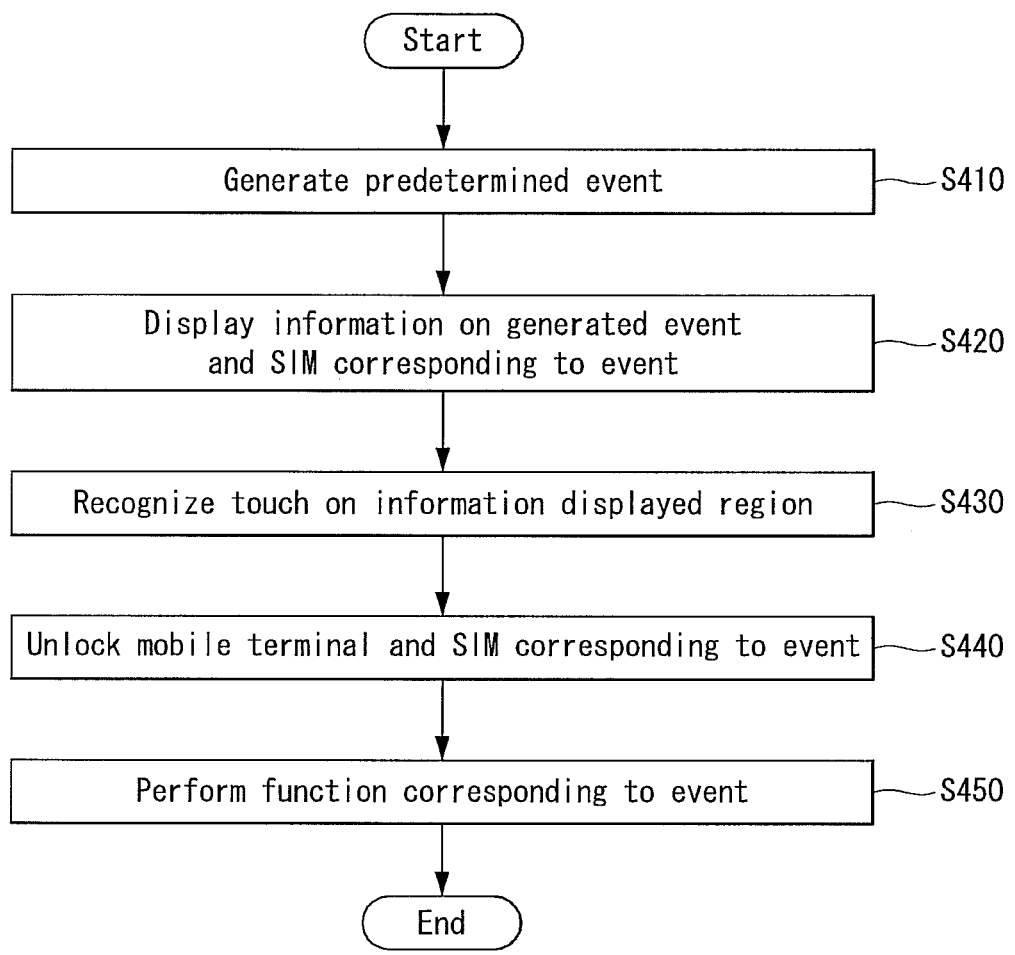
FIG. 15 is a flowchart that illustrates a method for operating a mobile terminal according to another embodiment of the present invention.

FIG. 15 is a flowchart that illustrates a method for operating a mobile terminal according to another embodiment of the present invention. Hereinafter, the method for operating a mobile terminal will be described in detail with reference to FIGS. 1 and 15.

At step S410, a predetermined event is generated while the mobile terminal 100 is locked and the first and second SIMs (SIM1 and SIM2) are locked. Then, the controller 180 of the mobile terminal 100 displays at least one piece of information on the generated event and information on a SIM related to the event at step S420.

The event may be receiving a call and a message while the mobile terminal 100 is locked. If the mobile terminal 100 receives a call while the mobile terminal 100 is locked, the controller 180 may display information related to the call receiving event on the touch screen. The information related to the call receiving event may include a message informing the receipt of a call, the telephone number of the caller, and/or the name of the caller. Furthermore, the controller 180 may display information on a SIM related to the call receiving event on the touch screen. The information related to a SIM may be the following message "A call is received through a SIM1."

When a user touches a region of the information related to a SIM at step S430, the controller 180 unlocks the SIM corresponding to the call receiving event in response to a control signal generated based on the touch at step S440 and performs a function corresponding to the call receiving event at step S450.

For example, when a user touches a message displayed on the touch screen of "a call is received through a first SIM (SIM1)," the controller 180 unlocks the mobile terminal 100 and the first SIM (SIM1) and performs a call connection function corresponding to the call receiving event at the same time.

Figure 16:
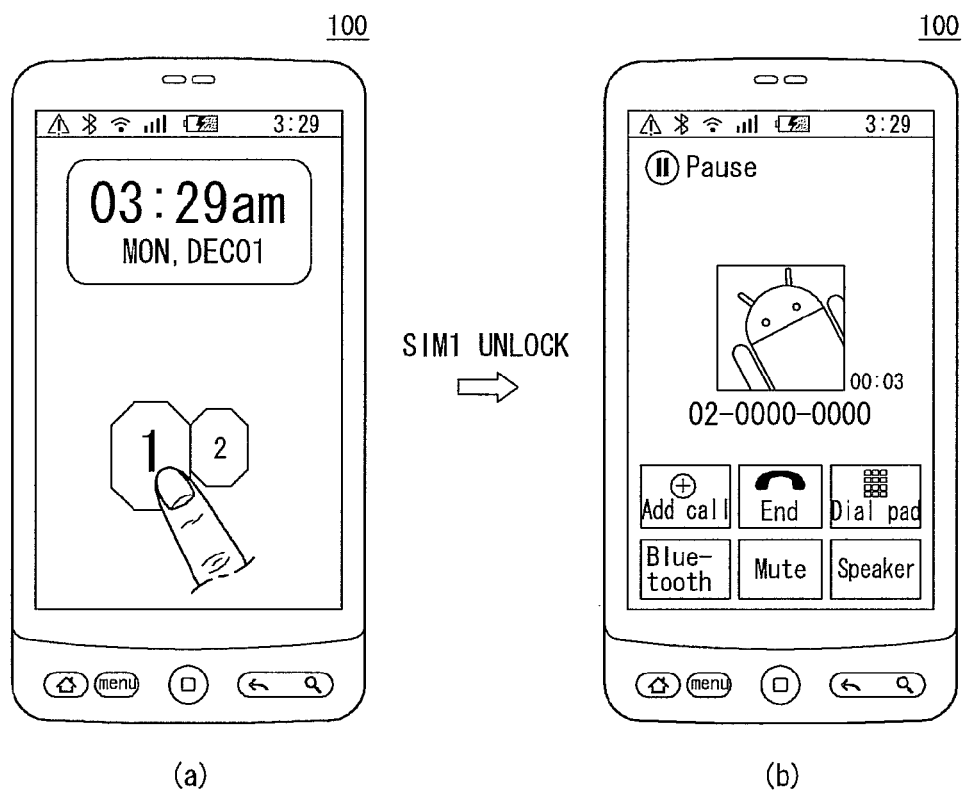
FIG. 16 illustrates a process of unlocking the first SIM according to the method for operating a mobile terminal of FIG. 15.

FIG. 16 illustrates a process of unlocking the first SIM according to the method for operating a mobile terminal of FIG. 15. For example, FIG. 16 illustrates the process of unlocking the first SIM (SIM1) when the mobile terminal 100 includes the first and second SIMs (SIM1 and SIM2) and receives a call through the first SIM (SIM1).

As shown in a diagram (a) of FIG. 16, when the mobile terminal 100 receives a call through the first SIM (SIM1) the controller 180 of the mobile terminal 100 displays an icon of the first SIM (SIM1) larger than an icon of the second SIM (SIM2) in order to inform a user that a received call is related to the first SIM (SIM1). The controller 180 may not display another information on a call receiving event on the touch screen.

When a user touches the icon of the first SIM (SIM1) after displaying the icon of the first SIM (SIM1) as shown in the diagram (a) of FIG. 16, the controller 180 unlocks the mobile terminal 100 and the first SIM (SIM1) and performs a call connection operation corresponding to the call receiving event at the same time as shown in a diagram (b) of FIG. 16.

Figure 17:
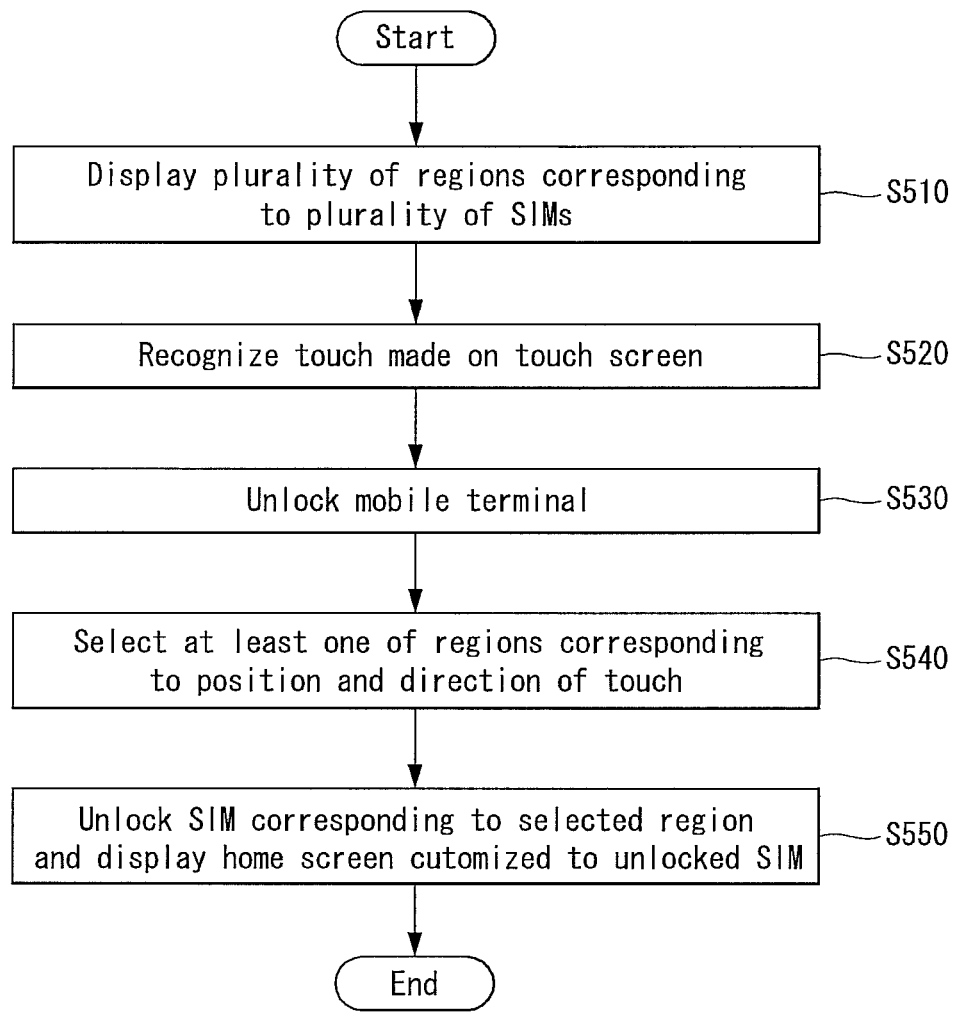
FIG. 17 is a flowchart that illustrates a method for operating a mobile terminal according to another embodiment of the present invention.

FIG. 17 is a flowchart that illustrates a method for operating a mobile terminal according to another embodiment of the present invention. Hereinafter, the method for operating a mobile terminal will be described in detail with reference to FIGS. 1 and 17.

When the mobile terminal 100 is waked up the controller 180 of the mobile terminal 100 displays a plurality of regions corresponding to a plurality of SIMs on the touch screen at step S510. The plurality of regions may be a home screen divided in regions, icons, or widgets corresponding to the plurality of SIMs. However, the present invention is not limited thereto.

When a user touches the touch screen at step S520 after displaying the plurality of regions, the controller 180 unlocks the mobile terminal 100 in response to the touch at step S530. The controller 180 also determines a position and a direction of the touch and selects one of the regions corresponding to at least one of the positions and the direction of the touch at step S540.

When one of the regions is selected, the controller 180 unlocks the SIM corresponding to the selected region and displays a home screen customized to the SIM of the selected region on the touch screen at step S550. The controller 180 may be set to perform different functions according to the unlocked SIM.

Although FIG. 17 illustrates the steps 530 to S550 as an independent step, the controller 180 may perform the steps 530 to S550 at the same time. That is, the controller 180 can simultaneously unlock the mobile terminal 100 and unlock the selected SIM among the plurality of SIMs.

Hereinafter, examples of the method for operating a mobile terminal of FIG. 17 will be described with reference to FIGS. 18 to 24.

Figure 18:
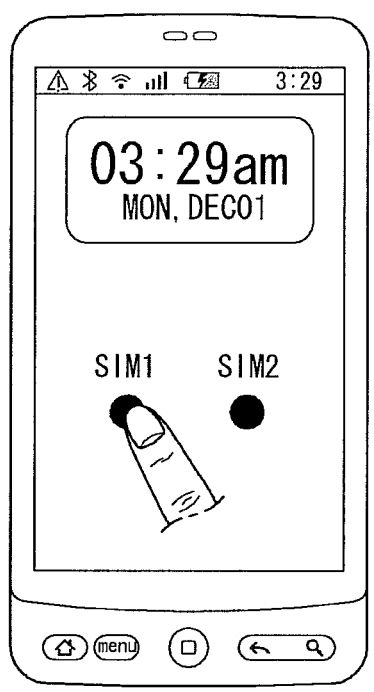
FIG. 18 illustrates a process of unlocking a SIM corresponding to a region that a user touches according to the method for operating a mobile terminal of FIG. 17.

FIG. 18 illustrates a process of unlocking a SIM corresponding to a region that a user touches according to the method for operating a mobile terminal of FIG. 17. Referring to FIG. 18, circular icons of the first and second SIMs (SIM1 and SIM2) are displayed on the touch screen. That is, the regions are illustrated as the circular icons in FIG. 18.

Referring to FIG. 18, the controller 180 of the mobile terminal 100 unlocks a SIM corresponding to an icon that the user touches. Although it is not shown in FIG. 18, when the users touches all icons the controller 180 may unlock the first and second SIMs (SIM1 and SIM2). That is, the controller 180 may unlock at least one SIM corresponding to at least one region among the plurality of regions.

Figure 19:
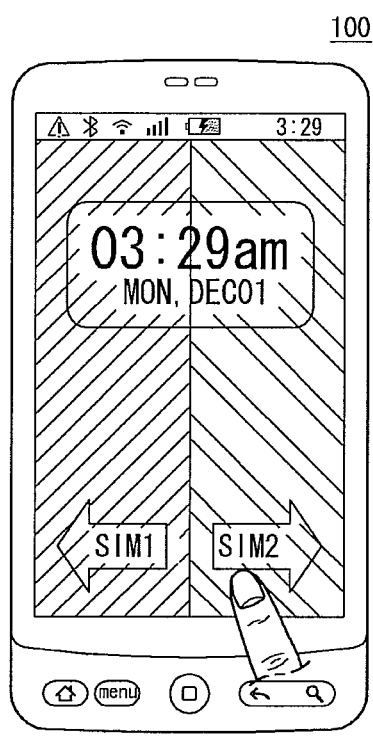
FIG. 19 illustrates a process of unlocking a SIM corresponding to a region related to the direction of drawn line according to the method for operating a mobile terminal of FIG. 17.

FIG. 19 illustrates a process of unlocking a SIM corresponding to a region related to the direction of drawn line according to the method for operating a mobile terminal of FIG. 17. Referring to FIG. 19, a background of the touch screen is divided to regions corresponding to the first and second SIMs (SIM1 and SIM2). That is, the regions are illustrates as divided background regions in FIG. 19.

Referring to FIG. 19, the controller 180 of the mobile terminal 100 unlocks a SIM corresponding to a direction of a line drawn by a user on the touch screen. For example, when a user draws a line on the touch screen in a right-to-left direction, the controller 180 unlocks the first SIM (SIM1). When a user draws a line on the touch screen in a left-to-right direction, the controller 180 unlocks the second SIM (SIM2).

Although it is not shown in FIG. 19, when the user draws lines from right to left and left to right at the same time, the controller 180 may unlock the first and second SIMs (SIM1 and SIM2). That is, the controller 180 may unlock at least one SIM corresponding to at least one region corresponding to a direction of drawn line.

Figure 20:
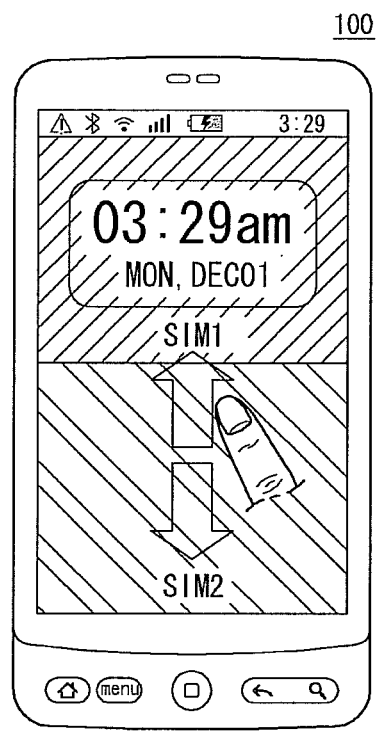
FIG. 20 illustrates another exemplary process of unlocking a SIM corresponding to a region related to a direction of a drawn line according to the method for operating a mobile terminal of FIG. 17.

FIG. 20 illustrates another exemplary process of unlocking a SIM corresponding to a region related to a direction of a drawn line according to the method for operating a mobile terminal of FIG. 17. In FIG. 20, the background is divided into an upper background region and a lower background region unlike the FIG. 19. Since the process of unlocking a SIM based on the direction of drawing a line is similar to that of FIG. 19, the detailed description thereof is omitted herein.

Figure 21:
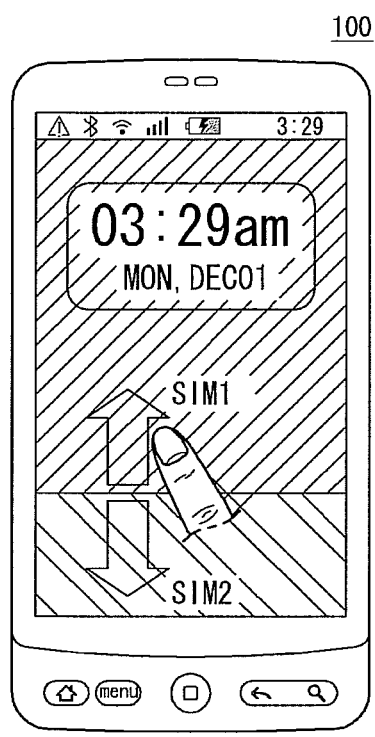
FIG. 21 illustrates another exemplary process of unlocking a SIM corresponding to a region related to the direction of a drawn line according to the method for operating a mobile terminal of FIG. 17.

FIG. 21 illustrates another exemplary process of unlocking a SIM corresponding to a region related to the direction of a drawn line according to the method for operating a mobile terminal of FIG. 17. In FIG. 21, a divided background region related to a SIM that the user most frequently uses occupies more area than the other divided background regions corresponding to a SIM used less frequently. Since the process of unlocking a SIM based on the direction of a drawn line is similar to that of FIG. 19, the detailed description thereof is omitted herein.

Figure 22:
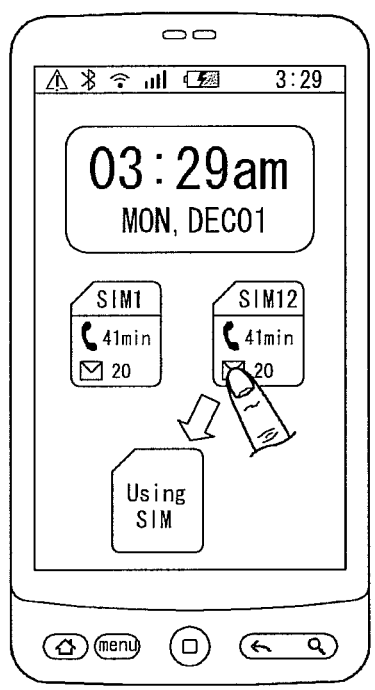
FIG. 22 illustrates a process of unlocking a SIM corresponding to dragging motion made by a user on a touch screen according to the method for operating a mobile terminal of FIG. 17.

FIG. 22 illustrates a process of unlocking a SIM corresponding to dragging motion made by a user on a touch screen according to the method for operating a mobile terminal of FIG. 17. Referring to FIG. 22, the touch screen displays widgets that show use-state information of the first and second SIMs (SIM1 and SIM2). That is, the regions are illustrated as the widgets in FIG. 22.

Referring to FIG. 22, when a user selects one of widgets displayed on the touch screen and drags the selected widget to a region labeled as "Using SIM," the controller 180 of the mobile terminal 100 unlocks the SIM corresponding to the dragged widget. For example, when the user selects a widget of the first SIM (SIM1) and drags the selected widget to the "Using SIM" region, the controller 180 unlocks the first SIM (SIM1). Furthermore, when the user selects a widget of the second SIM (SIM2) and drags the selected widget to the "Using SIM" region, the controller 180 unlocks the second SIM (SIM2).

Although it is not shown in FIG. 22, the user may select both of widgets of the first and second SIMs and drag the selected widgets to the "Using SIM" region at the same time. In this case, the controller 180 may unlock the first and second SIMs (SIM1 and SIM2). That is, the controller 180 can unlock at least one SIM in response to dragging one of widgets to a predetermined region.

Figure 23:
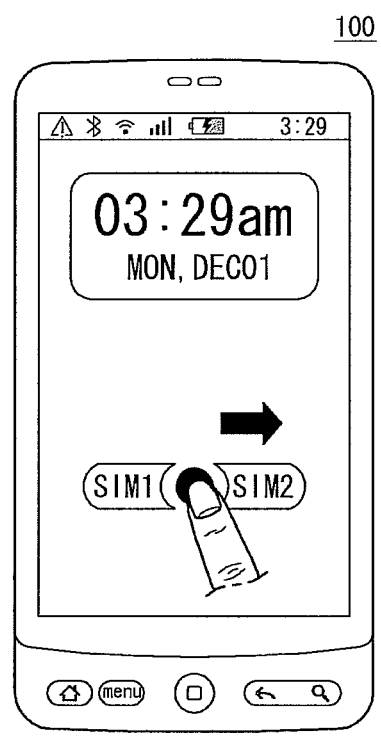
FIG. 23 illustrates another example of unlocking a SIM corresponding to a direction of drawing a line to a region on the touch screen according to the method for operating a mobile terminal of FIG. 17.

FIG. 23 illustrates another example of unlocking a SIM corresponding to a direction of drawing a line to a region on the touch screen according to the method for operating a mobile terminal of FIG. 17. Referring to FIG. 23, icons of the first and second SIMs (SIM1 and SIM2) and a circular icon are displayed on the touch screen. That is, the regions are illustrated as the icons in FIG. 23.

Referring to FIG. 23, the controller 180 of the mobile terminal 100 unlocks a SIM corresponding to a region selected by a direction of a drawn line from the circular icon. For example, when a user draws a line from the circular icon to the icon of the first SIM (SIM1), the controller 180 unlocks the first SIM (SIM1). When a user draws a line from the circular icon to the icon of the second SIM (SIM2), the controller 180 unlocks the second SIM (SIM2).

Figure 24:
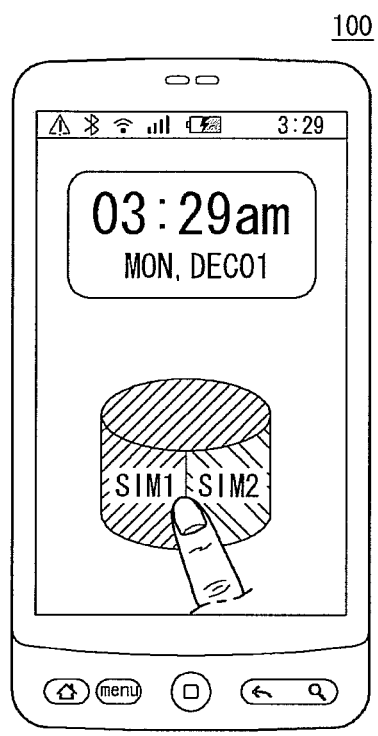
FIG. 24 illustrates another example of unlocking a SIM corresponding to a direction of drawing a line to regions on the touch screen according to the method for operating a mobile terminal of FIG. 17.
Figure 25:
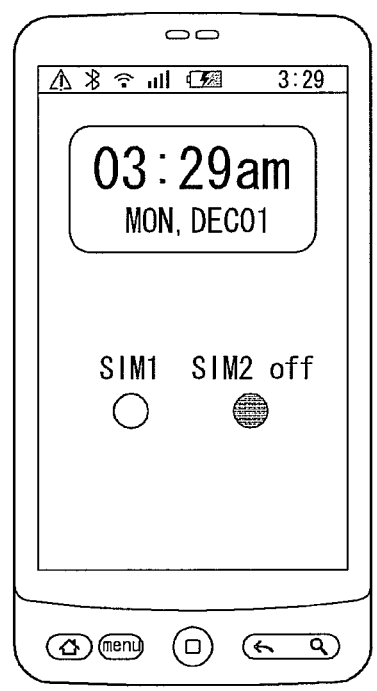
FIGS. 25 to 28 illustrate displaying information on which one of a plurality of SIMs is activated in a mobile terminal according to an embodiment of the present invention.
Figure 26:
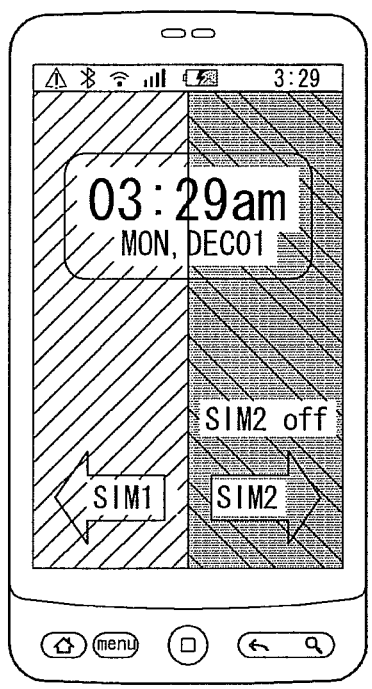
Figure 27:
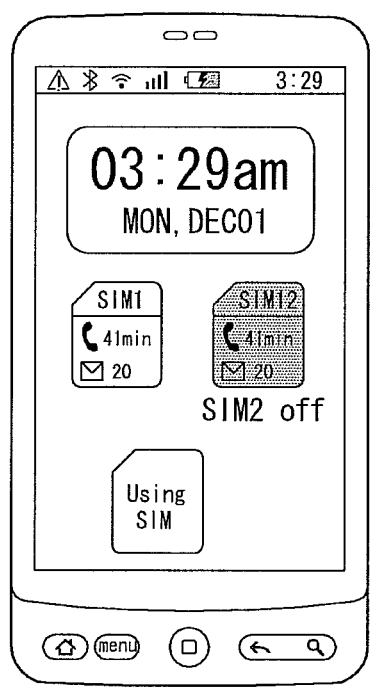
Figure 28:
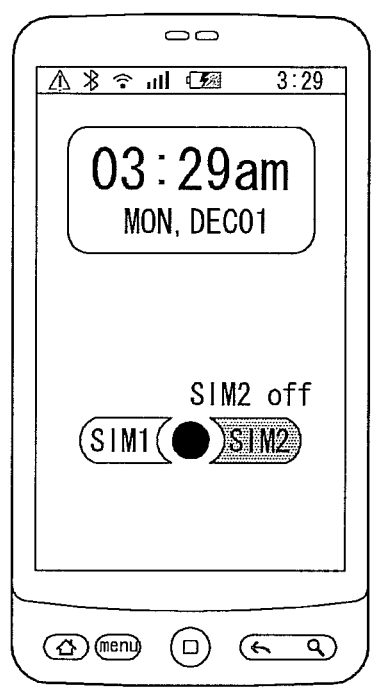

FIG. 24 illustrates another example of unlocking a SIM corresponding to a direction of drawing a line to regions on the touch screen according to the method for operating a mobile terminal of FIG. 17. Referring to FIG. 24, a cylinder having two divided regions is displayed on the touch screen. One divided region of the cylinder denotes the first SIM (SIM1) and the other denotes the second SIM (SIM2).

A user can selects one of the divided regions of the cylinder by rotating the cylinder in a predetermined direction to one of the divided regions. The SIM corresponding to the selected region is unlocked.

FIGS. 25 to 28 illustrate displaying information on which one of a plurality of SIMs is activated in a mobile terminal according to an embodiment of the present invention. In FIGS. 25 to 28, the touch screen displays information informing that the first SIM (SIM1) is activated and the second SIM (SIM2) is not activated.

Referring to FIGS. 25 to 28, the touch screen displays the second SIM (SIM2) is not activated as a message "SIM2 off". Also, a region of the second SIM (SIM2) is displayed darker among a plurality of SIM regions.

The user may unlock the first SIM (SIM1) by touching a corresponding region on the touch screen. However, the user cannot unlock the second SIM (SIM2) through touching the touch screen because the second SIM (SIM2) is not activated.

Figure 29:
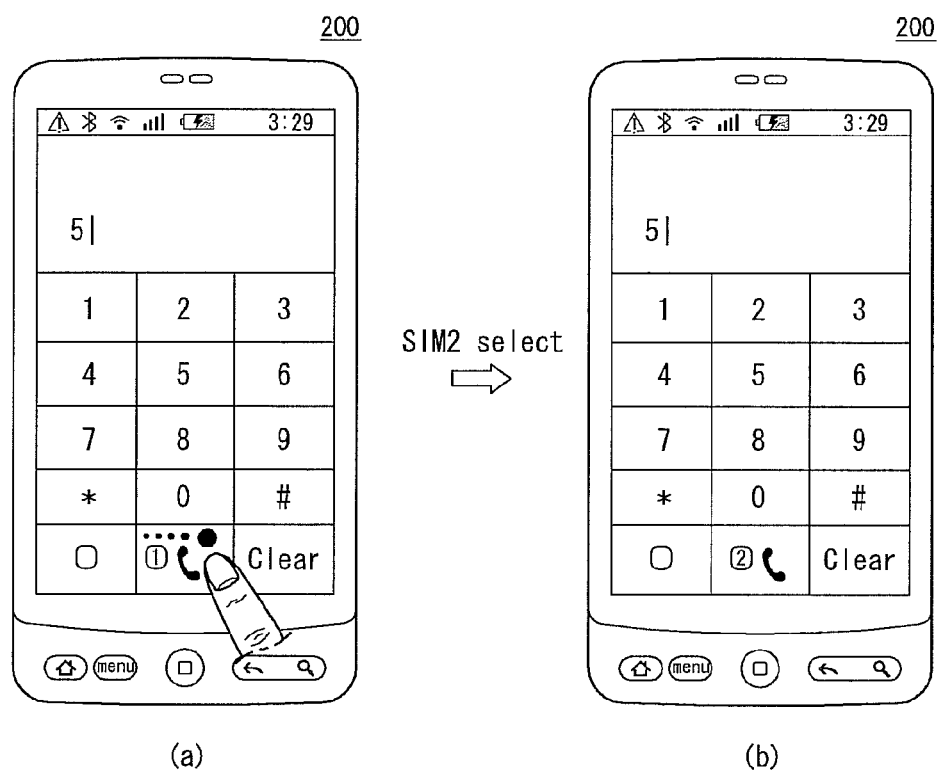
FIG. 29 illustrates a process of transmitting a call from a mobile terminal 200 as a comparison example.

FIG. 29 illustrates a process of transmitting a call from a mobile terminal 200 as a comparison example. That is, FIG. 29 shows that a user makes a call using the second SIM when the first SIM is set as a module to be used.

Referring to a diagram (a) of FIG. 29, a user drags a SIM region when the first SIM is set as a call transmitting module. Referring to a diagram (b) of FIG. 29, the controller of the mobile terminal 200 sets the second SIM as a call transmitting module.

Figure 30:
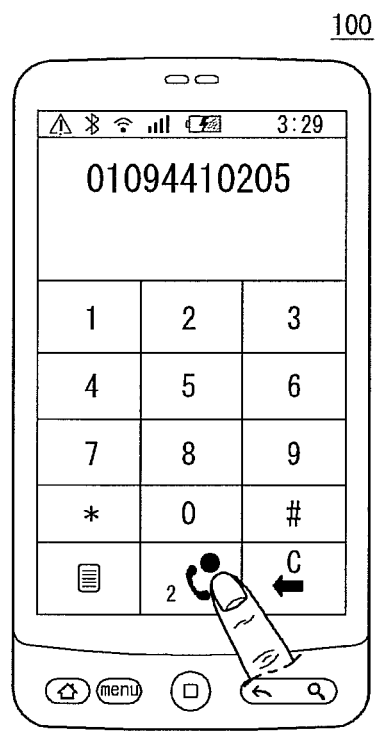
FIG. 30 illustrates a process of making a call in a mobile terminal 100 according to an embodiment of the present invention.

FIG. 30 illustrates a process of making a call in a mobile terminal 100 according to an embodiment of the present invention. FIG. 30 shows a process of making a call after unlocking the mobile terminal 100 and the second SIM (SIM2) in response to a touch that a user makes on the touch screen.

Referring to FIG. 30, since the user selects a SIM to be used by touching the touch screen, the user can make a call using the second SIM (SIM2) without additional operation to set the second SIM as a call transmitting module.

That is, the call making process of the mobile terminal 100 according to the present embodiment is easier than that of the mobile terminal 200. Such convenience is identically applied to a process of transmitting a message and a process of web-browsing.

The above-described mobile terminal operating method may be written as computer programs and may be implemented in digital microprocessors that execute the programs using a computer readable recording medium. The method of operating the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a touch screen to receive a touch input;
   an interface unit to mount a plurality of user identification modules, wherein each user identification module stores information for obtaining authority to use a corresponding service network; and
   a controller to unlock the mobile terminal and selectively unlock at least one user identification module from among the plurality of user identification modules in response to the touch input, wherein the at least one user identification module corresponding to the touch input, and the at least one user identification module is to be used by the unlocked mobile terminal, wherein the at least one user identification module includes a subscriber module (SIM) card or a SIM chip, wherein at least two of the user identification modules are at least two different SIM cards or at least two different SIM chips,
   wherein the controller is configured to display, on the touch screen:
   a first home screen including icons and widgets that are customized to a first user identification module in case that the first user identification has been unlocked by the touch input, a second home screen including icons and widgets that are customized to a second user identification module in case that the second user identification has been unlocked by the touch input, and a common home screen including common icons and widgets that are commonly customized to the first and second user identification modules in case that the first and second user identifications have been unlocked by the touch input, wherein the controller displays, on the touch screen, the common home screen including a common icon or a common widget of the first and second user identification module, when the first and second user identification modules are selected in response to the touch input.

2. The mobile terminal of claim 1, wherein the controller determines a direction of the touch input and unlocks a specific one of the user identification modules based on the determined direction of the touch input, wherein the specific one of user identification modules is in an active state after the specific one of the user identification modules is unlocked.

3. The mobile terminal of claim 2, wherein the controller unlocks the specific one of the user identification modules when the controller determines that the touch input is made in a predetermined direction that is previously set to correspond to the specific one of the user identification modules.

4. The mobile terminal of claim 2, wherein the controller determines that the touch input is in a predetermined direction, the predetermined direction being previously set to correspond to at least two of the user identification modules, and the controller unlocks the at least two of the user identification modules in response to the controller determining the touch input in the predetermined direction.

5. The mobile terminal of claim 1, wherein the controller determines a predetermined character based on the touch input on the touch screen and the predetermined character is previously set to correspond to a specific one of the user identification modules, and wherein the controller unlocks the specific one of the user identification modules in response to the controller determining the predetermined character.

6. The mobile terminal of claim 1, wherein the controller displays, on the touch screen, a home screen customized to the specific identification module when the specific user identification is selected in response to the touch input, wherein the home screen includes an icon or a widget customized to the specific user identification module corresponding to the touch input.

7. The mobile terminal of claim 1, wherein the controller sets a distinct function to be performed based on the unlocked user identification module.

8. The mobile terminal of claim 1, wherein the controller displays, on the touch screen, information relating to the at least one user identification module when the at least one user identification module is unlocked in response to the touch input.

9. The mobile terminal of claim 1, wherein the controller displays, on the touch screen, information of a use state of the at least one user identification module when the at least one user identification module is unlocked in response to the touch input.

10. The mobile terminal of claim 1, wherein the controller is configured to:
display, on the touch screen, information on a predetermined event and a user identification module corresponding to a predetermined event associated with a specific service network when the predetermined event is generated while the mobile terminal is locked, unlock the mobile terminal, select the user identification module corresponding to the predetermined event, and perform a function corresponding to the predetermined event when the touch input corresponding to the user identification module corresponding to the predetermined event is received.

11. The mobile terminal of claim 10, wherein the predetermined event includes a call receiving event and a message receiving event.

12. A mobile terminal comprising:
a receiving device to simultaneously receive a plurality of user identification modules;
a touch screen that includes a plurality of regions each corresponding to a specific one of the plurality of user identification modules; and
a controller to unlock both the mobile terminal and a user identification module that corresponds to a selected one of the plurality of regions in response to a touch input on the touch screen, wherein the selected one of the regions is determined based on one of a position of the touch input or a direction of the touch input, wherein the user identification module is to be used by the unlocked mobile terminal, wherein the user identification module includes a subscriber module (SIM) card or a SIM chip, wherein at least two of the user identification modules are at least two different SIM cards or at least two different SIM chips,
wherein the controller is configured to control the touch screen to display:
a first home screen including icons and widgets that are customized to a first user identification module when the first user identification is unlocked based on the touch input,
a second home screen including icons and widgets that are customized to a second user identification module when the second user identification is unlocked based on the touch input, and
a common home screen including common icons and widgets that are commonly customized to the first user identification module and the second user identification module when the first and second user identifications are unlocked based on the touch input, wherein the controller displays, on the touch screen, the common home screen including a common icon or a common widget of the first and second user identification module, when the first and second user identification modules are selected in response to the touch input.

13. The mobile terminal of claim 12, wherein the controller unlocks a specific one of the user identification modules that corresponds to the selected one of the regions based on the touch input.

14. The mobile terminal of claim 12, wherein the controller unlocks a specific one of the user identification modules that corresponds to the selected one of the plurality of regions based on a direction of the touch input.

15. The mobile terminal of claim 12, wherein the controller unlocks a specific one of the user identification modules in response to dragging an object from one of the regions to a predetermined target region on the touch screen.

16. The mobile terminal of claim 12, wherein the controller unlocks a specific user identification module that corresponds to the selected one of the regions of the touch screen based on the direction of the touch input made on at least one of the regions.

17. The mobile terminal of claim 12, wherein the controller displays, on the touch screen, a screen that corresponds to the unlocked user identification module.

18. The mobile terminal of claim 12, wherein the controller sets a distinct function based on the unlocked user identification module.

19. The mobile terminal of claim 12, wherein the controller displays, on the touch screen, information related to the user identification module when the user identification module is unlocked in response to the touch input.

20. The mobile terminal of claim 12, wherein the controller displays, on the touch screen, information of a use state of the user identification module when the user identification module is unlocked in response to the touch input.

21. The mobile terminal of claim 12, wherein the controller displays, on the touch screen, information on a predetermined event and the user identification module set corresponding to the predetermined event on a predetermined display region when the predetermined event is generated, and wherein the predetermined display region is previously set to correspond to the user identification module.

22. A method for operating a mobile terminal that simultaneously receives a plurality of user identification modules, the method comprising:
    recognizing a touch input on a touch screen;
    unlocking both the mobile terminal and at least one of the plurality of user identification modules from among the plurality of user identification modules in response to the recognized touch input, wherein the at least one user identification module corresponds to the touch input, and the at least one user identification module to be used by the unlocked mobile terminal, wherein the at least one user identification module includes a subscriber module (SIM) card or a SIM chip, wherein at least two of the user identification modules are at least two different SIM cards or at least two different SIM chips; and
    displaying on the touch screen:
    a first home screen including icons and widgets customized to a first user identification module in response to unlocking of the first user identification based on the touch input,
    a second home screen including icons and widgets customized to a second user identification module in response to unlocking of the second user identification based on the touch input, and
    a common home screen including common icons and widgets customized to the first and second user identification modules in response to unlocking of the first and second user identifications based on the touch input, wherein the common home screen including a common icon or a common widget of the first and second user identification module is displayed on the touch screen, when the first and second user identification modules are selected in response to the touch input.

23. The method of claim 22, wherein a specific one of the user identification modules is unlocked when the touch input is recognized as being in a predetermined direction that is previously set to correspond to the specific one of the user identification modules.

24. The method of claim 22, wherein a specific one of the user identification module is unlocked when a predetermined character is recognized as the touch input on the touch screen and the predetermined character is previously set to correspond to the specific one of the user identification modules.

25. The method of claim 22, wherein at least two of the user identification modules are unlocked when the touch input on the touch screen is recognized in a predetermined direction, the predetermined direction being previously set to correspond to at least two of the user identification modules.

26. The method of claim 25, further comprising displaying items corresponding to each of the at least two user identification modules.

27. The method of claim 22, wherein unlocking both the mobile terminal and at least one of the plurality of user identification modules includes:
    unlocking at least one of the user identification modules based on one of a position of the touch input and a direction of the touch input.

28. The method of claim 22, further comprising performing a call communication through a network of the unlocked user identification module.

* * * * *